April 22, 1969 W. M. PELINO 3,440,416
HOTBOX DETECTOR SYSTEM
Filed Feb. 9, 1966
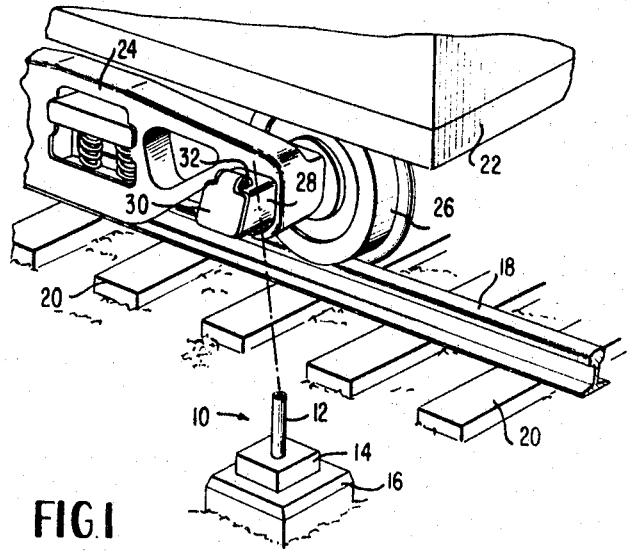
FIG.1
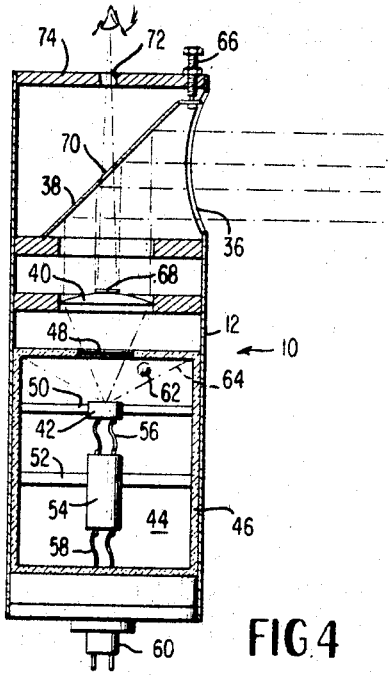
FIG.4
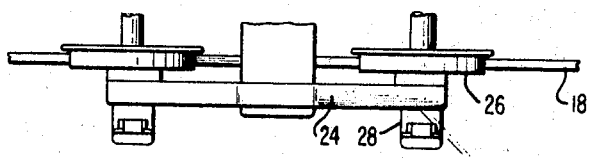
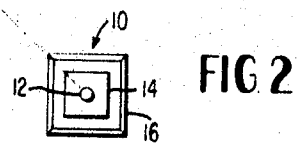
FIG.2
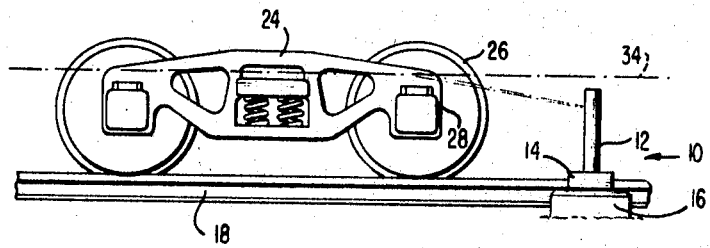
FIG.3
INVENTOR
WILLIAM M. PELINO
ATTORNEY April 22, 1969

W. M. PELINO 3,440,416

HOTBOX DETECTOR SYSTEM

Filed Feb. 9, 1966

INVENTOR
WILLIAM M. PELINO

BY

ATTORNEY

United States Patent Office 3,440,416
Patented Apr. 22, 1969

3,440,416
HOTBOX DETECTOR SYSTEM
William M. Pelino, Richmond, Va., assignor to Railtron Corporation, Richmond, Va., a corporation of Virginia
Filed Feb. 9, 1966, Ser. No. 526,129
Int. Cl. B61l 3/02; B61k 9/06
U.S. Cl. 246—169      6 Claims

ABSTRACT OF THE DISCLOSURE

A new means for detecting hotboxes or overheated bearings in railroad cars is disclosed herein, by means of which the temperature of the vertical face of the arch bars of the wheel trucks is detected as a greatly improved indication of overheated journals or bearings.

---

This invention pertains generally to so-called hotbox detector systems for detecting overheated axle bearings in railroad cars, and more particularly to hotbox detectors of the radiant energy or infra-red type, wherein an infra-red or other radiant energy detecting means is positioned at wayside for monitoring the temperature of axle bearings of railroad cars traversing the associated track.

Hotbox detector systems are, as a general subject, old and well-known to those skilled in the art, and the variations in specific details in these systems are many. Some of the earliest attempts to provide a satisfactory safeguard against overheated journals and other bearings, which, if left unattended, generally resulted in destruction of the bearing, included devices carried on the railroad cars and providing indications of the bearing temperature, either quantitatively, as by displaying a temperature, or qualitatively, as by ignition of an explosive or the like once a threshold temperature in the bearing was exceeded.

More advanced techniques were subsequently developed in which radiant energy detectors, usually infrared bolometers, were positioned at wayside for scanning the journal boxes of the wheel trucks of passing cars and providing an alarm or other signal upon the occurrence of a hotbox, that is, a journal box in which a lack of lubrication, for example, has resulted in increased friction and resultant radiation of a detectable amount of infrared energy.

Of this latter type of hotbox detector, several different techniques have been employed in the past in an effort to provide a safe warning system free from erroneous readings or outputs. In some instances, a radiant energy detector has been placed at railside at a position over which the journal boxes travel as the train moves along the track. These detectors look up at the journal boxes at an angle in the vertical plane, so as to scan the front (or leading) and back faces of the boxes as the latter approach or pass beyond the detector position. This system of detection, while providing an improvement over previous systems, has several inherent disadvantages, not the least of which is the fact that a moderate snowfall usually blinds the detector, since the latter stands no higher than the rails on which the cars ride. Heaters have been employed to melt the snow away from the railside detectors, but the expense of installation and operation generally renders this solution economically prohibitive. Also, elaborate and expensive protective structures are usually required to protect railside detectors. Further, detector units which employ viewing angles as steep as those required for railside detection often give faulty indications when bright sky is seen through open portions of certain types of railroad cars, rather than the relatively dark journal boxes or the like.

Another type of hotbox detector that has been utilized in the past constitutes a wayside detector installation, approximately at axle height, and adapted to look at or scan the outer face or cover of the journal box or, in some instances, the hub of the associated wheel. However, here, too, misleading results have been obtained. In some cases, these wayside detectors also see the brake shoes associated with the wheels, and quite often the shoes are at a temperature considerably higher than that which is normal for a journal box or other bearing housing, thus causing a false alarm. Also, in the event a journal box lid is left open, affording a direct view of the bearing, a false alarm is given.

Irrespective of the type of detector unit that one may choose from the prior art, as long as the detector looks directly at the bearing housing, whether it be a friction babbitt bearing or a roller bearing, there is the likelihood of confusion between the two types of bearings. That is to say, since a large percentage (perhaps over 75%) of the maximum internal temperature of a roller bearing appears on the exterior face of the bearing housing, and a low percentage (on the order of 20%) of the maximum internal temperature of a journal bearing is viewable from the exterior of the box, the radiation emitted from a normal roller bearing appears to an infra-red detector like an overheated journal box. Where both roller and journal bearings are employed in a given train, it is difficult to establish an alarm threshold sufficiently low to provide a normal output for normal journal box temperatures without initiating an alarm upon the passage of a normal (but hotter) roller bearing.

A further disadvantage of the devices of the prior art is the difficulty encountered in aligning the detector units so that it views the exact scene or wheel truck portion intended to be monitored.

Accordingly, it is a primary object of the present invention to provide a hotbox detector system of the radiant energy type which avoids the aforementioned shortcomings and disadvantages of the devices of the prior art.

A more specific object of the present invention is to provide a hotbox detector system of the radiant energy type which is characterized by a relatively low percentage of false indications.

Another object of the present invention is to provide a hotbox detector system of the radiant energy type which avoids the disadvantages of the prior art without necessitating expensive and complicated installations.

Yet another object of the present invention is to provide a hotbox detector system of the radiant energy type the output of which is not adversely affected by the presence of both roller and journal bearings in a given train.

Still another object of the present invention is to provide a hotbox detector system of the radiant energy type with improved means for orienting the detector unit.

In accordance with the present invention, these and other objects are achieved by means of a hotbox detector system having a heat-sensitive element which provides an electrical output indicative of the amplitude of the infra-red energy incident thereupon, and means for optically imaging on said heat-sensitive element a portion of the vertical face of the arch bars of the wheel trucks of railroad cars which traverse the track at the location of the hotbox detector. In the preferred embodiment disclosed herein, the hotbox detector comprises a vertical standard at wayside, with a viewing aperture therein at approximately axle height, and employing a viewing angle of approximately 45° in a horizontal plane with respect to the direction of motion of the train.

Further, a pulsed heat source is provided for irradiating the heat-sensitive element with infra-red energy as each wheel of a train passes the observation point, so as to provide a self-checking operation affording a normal or standard output upon the passage of each wheel even in the absence of a hotbox or overheated bearing.

In addition, in the preferred embodiment shown herein, a mirror is positioned on the face of the heat-sensitive element, covering only a small portion thereof, and means are provided for mechanically adjusting the viewing angle of the detector to create a desired image on the heat-sensitive element, as observed on the mirror.

With the above considerations and objects in mind, the invention itself will now be described in connection with a preferred embodiment thereof, given by way of example and not of limitation, and with reference to the accompanying drawings, in which:

FIG. 1 is a perspective view of a typical installation of a preferred embodiment of the hotbox detector of the present invention;

FIG. 2 is a schematic representation of the device and installation of FIG. 1, in plan view;

FIG. 3 is a schematic representation in vertical elevation of the device and installation of FIG. 1;

FIG. 4 is a vertical section view of the detector device shown in FIG. 1; and

Figure 5:
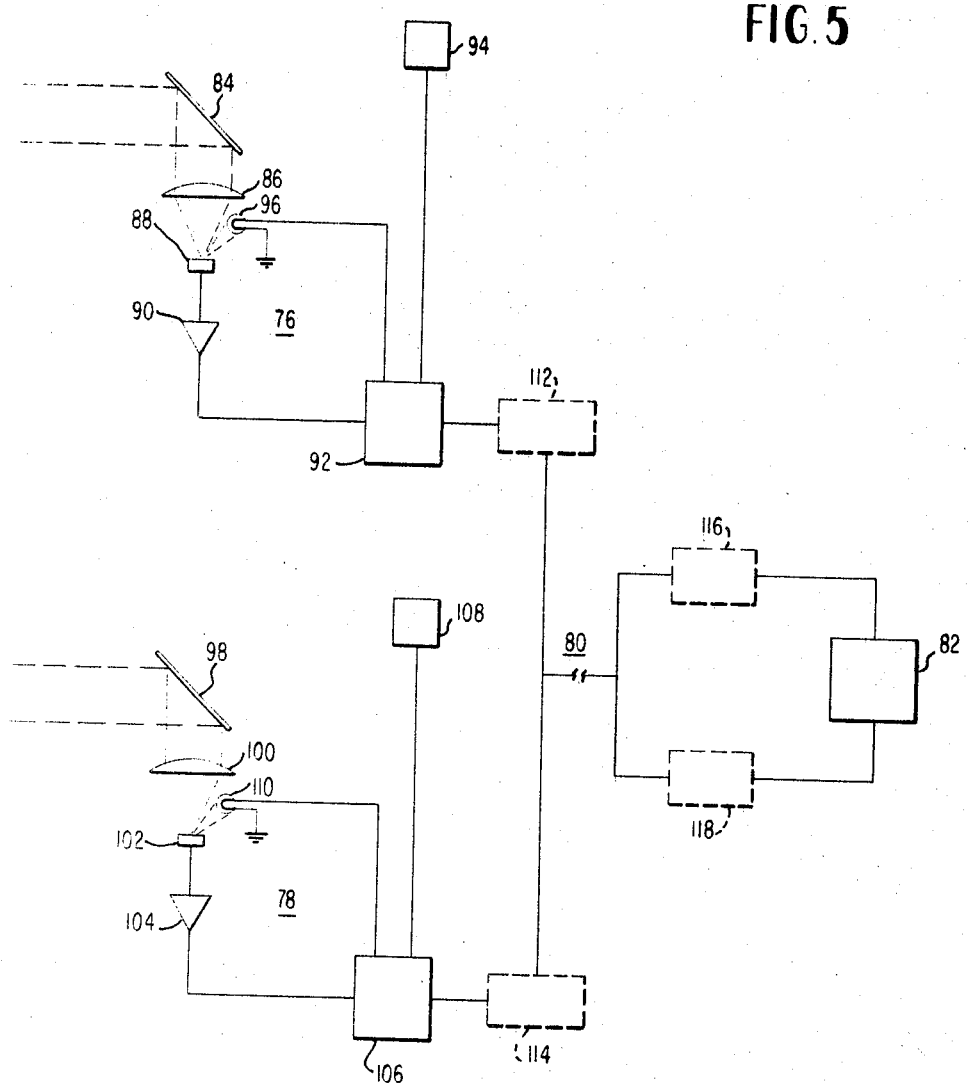
FIG. 5 is a block diagram of a representative circuit in which the detector device of this invention may be employed.

Referring now particularly to FIG. 1, the hotbox detector device of the present invention is indicated generally at 10, comprising an upright or vertical standard 12 and a base 14 supported by a concrete pillar 16 or the like. The hotbox detector 10 is positioned at the wayside of track 18, which is supported by cross ties 20.

A railroad car frame 22 is supported in the usual manner by a plurality of wheel trucks 24, one of which is shown in FIG. 1 with an associated wheel 26. The truck assembly 24 includes a journal box 28 having a cover 30 pivotally mounted thereon by means of hinge pin 32, and as will be understood, the journal 28 is the rotary bearing for the axle, not shown, of wheel 26.

As was stated above, the prior art hotbox detectors have been designed to observe the temperature of the fore and aft walls of the journal box, the cover of the journal box and the wheel hubs. However, each of these devices of the prior art is limited in one manner or another as a result of the particular angle of observation employed, as discussed above. In accordance with the present invention, the disadvantages of the devices of the prior art are avoided by the utilization of a line of observation that is substantially horizontal at axle height and at a significant angle with respect to the direction of motion of a train traversing the associated track. In the preferred embodiment of the present invention, this line of observation is at substantially 45° in the horizontal plane and is directed slightly upwardly away from the hotbox detector at approximately 5° in the vertical plane. By means of this viewing alignment, the hotbox detector of the present invention scans the arch bar of the wheel trucks, rather than any of the faces of the journal box or the wheel hubs. More particularly, it has been discovered that the portion of the arch bar immediately above the journal box presents an excellent target to reveal the thermal changes taking place inside the journal boxes. Since this portion of the arch bar immediately above the journal box is generally hidden by the hinge pin assembly of the journal box of the standard freight car truck, the line of observation in the present invention is at an angle with respect to the direction of movement of the train so as to permit observation of the arch bar portion behind the hinge pin assembly. This angle in the horizontal plane may conveniently vary between approximately 30° and approximately 60° with respect to the track rails, and as has been stated, may conveniently be 45°, as set forth in this preferred embodiment. The slight vertical inclination of the line of observation permits a somewhat shorter vertical dimension of the hotbox detector to be consistent with standard railroad clearance diagrams. While there is a slight effect of Lambert's cosine law governing the radiation pattern of the target, it has been found that the energy received by the hotbox detector of this invention is at least 70 percent of the energy which would be received from the given target area if viewed perpendicularly or at 90° to the plane of the side frame of the railroad car.

In accordance with the present invention, the various wheel diameters currently used on American railroad rolling stock have little influence on the efficiency of the device of the present invention in detecting hotboxes. While conventional wheel diameters vary from 28 inches to 36 inches (not including locomotive wheels), the centerline variation of axles is only 4 inches. With the sensor of the present invention aligned for the predominate 33 inch wheel, the scan line height variations for different size wheels varies only plus or minus 2 inches from the aiming point, and the temperature gradiant over this small variation has no significant effect upon the ability of the hotbox detector of the present invention to discriminate between normal journals and hotboxes.

With the sensor alignment or orientation of the present invention, the prior art problem of observing relatively hot brake shoes is obviated, since the brake shoes of the railroad cars are considerably below the line of observation employed herein. Also, roller bearings present a smaller problem than with the devices of the prior art, since the lateral movements permitted by the roller bearings do not remove the arch bar from the field of view of the detector of the present invention. Further, when not viewing wheel trucks, the sensor sees the side sill, the center sill or the coupler between cars, thus precluding the undesired view of sky background throughout the length of the train.

FIG. 2 shown in plan view the relative alignment of the hotbox detector 10 of the present invention and a wheel truck including arch bar 24 and journal box 28. In accordance with the preferred embodiment of this invention, the angle of observation is shown at 45° in the horizontal plane.

FIG. 3 shows the relative alignment and orientation of the hotbox detector 10 of the present invention in vertical elevation. The line of scan along arch bar 24 is indicated by the broken line 34, lying just above the top of the journal box 28, and the angle of view from hotbox detector 10 is shown at approximately 5° in the vertical plane.

FIG. 4 shows in greater details the construction of the preferred embodiment of the hotbox detector unit 10 of the present invention. The cylindrical housing 12 includes an aperture 36 for receiving the desired radiation, and a planar mirror 38 is positioned within the upper part of housing 12 at substantially 45° with respect to the direction of the incoming radiation, so as to reflect the latter vertically downward to a suitable lens 40 which focuses the radiation on an infra-red cell or other heat-sensitive element 42.

The lower portion of housing 12 comprises an oven unit 44 defined by a thermal wall 46 and heated by means not shown so as to maintain a steady ambient temperature for the heat cell 42 therein. A suitable transparent membrane 48 is employed in the upper wall of oven 44 to permit the infra-red radiation focused by lens 40 entry into the oven, while maintaining the temperature therein. A suitable support 50 is employed to position the heat cell 42, and a similar support 52 is employed to mount a preamplifier unit 54 within the oven 44. Electrical conductors 56 connect the heat cell 42 to the input of preamplifier 54, and similar conductors 58 connect the output of preamplifier 54 with the output connector 60.

A small lamp or source of heat 62 is positioned within the field of view of infra-red cell 42 indicated by the broken line 64, and lamp 62 acts as a controllable heat source to provide a self-checking feature for the hotbox detector of this invention, in a manner to be described further in connection with FIG. 5.

Planar mirror 38 is mounted within housing 12 in a manner permitting slight pivotal movement about the lower end of mirror 38, in accordance with the positioning of a screw adjusting means 66 connected to the upper end of mirror 38. As will be understood, the movement up or down of the adjusting screw 66 will pivot mirror 38 about its lower edge and thereby adjust the angle of view of the detector device in the vertical plane to permit proper alignment of the viewing means. So that an operator may accurately align mirror 38 for the desired view, a small mirror 68 or other reflecting surface is positioned at approximately the center of the upper face of lens 40, in substantial alignment with a central aperture 70 in mirror 38. A viewing aperture 72 is provided in the top 74 of the cylindrical housing 12 and in substantial alignment with aperture 70 and mirror 38 and the reflecting surface 68 on lens 40. Thus, an observer looking down through aperture 72 will see the mirror 68 through aperture 70 in mirror 38, and will see on mirror 68 the center of the scene seen by the detector 10. The screw 66 may thus be adjusted to alter the line of observation until the center of the desired scene (the vertical face of the arch bar just above the journal box) is seen on the reflecting surface 68.

A representative circuit in which one or more of the hotbox detector units of the present invention may be employed is shown in FIG. 5, wherein a pair of hotbox detectors 76 and 78 are connected through a common circuit to a recording means 82. As was described in connection with FIG. 4, hotbox detector 76 includes planar mirror 84 for reflecting incoming radiation toward lens 86, with the latter focusing the incoming radiation on infra-red cell 88. The output of heat-sensitive cell 88 is applied to preamplifier 90, the output of which is applied to a gating means 92 which is under the control of a railside wheel detector 94. Auxiliary heat source or lamp 96, within the field of view of heat-sensitive cell 88, is connected to gating means 92 so as to be energized under the control of wheel detector 94.

Similarly, hotbox detector 78 comprises a planar reflector or mirror 98 which reflects the incoming radiation to a lens 100, with the latter focusing the radiation on infra-red cell 102. The output of infra-red cell 102 is applied to the input of a preamplifier 104, the output of which is in turn applied to the input of gating means 106. A wheel detector 108 controls the operation of gating means 106, including the energization of auxiliary heat source 110.

If carrier transmission is desired, the outputs of gating means 92 and 106 are applied, respectively, to carrier transmitters 112 and 114, the outputs of which are transmitted by transmission line 80 to the recording means 82 through respective carrier receivers 116 and 118. Obviously, if carrier transmission is not desired or necessary, the carrier transmitters 112 and 114, along with respective carrier receivers 116 and 118 may be omitted.

In the operation of the hotbox detector system shown in FIG. 5, the planar mirror 84 continuously scans along the desired line of viewing to present a continuous scene focused on infra-red cell 88. Upon the passage of a wheel of a railway car past wheel detector 94, gate 92 serves to connect a source of power (not shown) to auxiliary lamp 96 to provide a pulse of infra-red or heat energy to heat-sensitive cell 88. The output of cell 88 thus represents the combined inputs from auxiliary lamp 96 and the scene being viewed, and this output is amplified by preamplifier 90 and applied to gating means 92. Since this action is substantially instantaneous, the gate 92 is still in a condition to pass the output of preamplifier 90 to carrier transmitter 112.

Similarly, upon the passage of a railway car wheel over wheel detector 108, the gate 106 connects a voltage source (not shown) to auxiliary lamp 110 to provide a pulse of heat energy from the lamp to be received by heat cell 102 along with the infra-red radiation reflected thereon by planar mirror 98. The output of cell 102 represents the combined heat energy inputs, and this electrical signal is applied to preamplifier 104 and passed by gate 106 to carrier transmitter 114.

The combined signals from the hotbox detectors are transmitted over transmission line 80 to a suitable remote location for the recording means 82, which may be a pen and moving paper recorder of the usual type. The several signals may, of course, be separated by respective carrier receivers 116 and 118 before being applied to the recorder 82.

The presence of the auxiliary pulsed heat lamps, such as 96 and 110 in FIG. 5, permits the aforementioned self-checking feature of the present invention. The need for such a system-proving circuit arises, for example, in those situations where a train has traveled only a short distance when it passes the hotbox detector location. Obviously, if the train has moved only a short distance, the bearings will not have achieved a significant temperature, whether a normal bearing or a faulty bearing which after an extended run will constitute a hotbox. In the circuit of the present invention, the auxiliary heat lamps are pulsed by activation of the railside wheel detectors to supply a burst of heat energy to the respective heat-sensitive cells, without interfering with the incoming radiation emanating from the arch bars of the passing train, since the auxiliary lamps are positioned out of the path of energy focused by the respective lenses. Thus, when a wheel truck of a railway car passes one of the hotbox detector locations, a standard monitoring pulse is supplied through the heat-sensitive cell, the preamplifier and the gate to the recorder to indicate that the system is functioning properly. When radiation is received from a relatively hot arch bar, whether at a temperature indicating a normal running bearing or a hotbox, the incoming radiation is added to the pulse supplied by the auxiliary heat lamp, and the electrical output of the preamplifier is representative of the sum of these two heat inputs. Obviously, these different levels of input will appear as different recorded amplitudes on the recorder 82, and the operator may easily distinguish between the monitoring pulses, the amplitude of the normal bearings and the larger amplitude corresponding to a hotbox.

The invention has been described above in some detail, and particularly in connection with an infra-red hotbox detector system for journal bearings. However, it will be apparent to those skilled in the art that the invention is also applicable to other than mere journal bearings, such as roller bearings, and that the inventive concept therein is not necessarily limited to the specific wave length normally intended by the use of the term infra-red. Also, the system of the present invention may be employed with a single hotbox detector unit, a pair (as shown in FIG. 5) or a larger plurality of units, as desired. Further, the specific angles of observation set forth in connection with the description of the embodiment disclosed herein are representative of a preferred embodiment only. Hence, the invention is not to be considered as limited to the particular details given, nor to the specific application to which reference has been made during the description of the invention, but should be considered as extending to encompass all such revisions and modifications as would be obvious to a workman of ordinary skill in the art.

What is claimed is:

1. A hotbox detector system for detecting overheated axle bearings in railroad cars having wheel trucks including arch bars extending between bearing housings, comprising heat-sensitive means for providing an output indicative of the heat energy incident thereupon and means adapted to be mounted alongside a track traversed by such railroad cars for optically imaging on said heat-sensitive means a portion of the vertical face of the arch bars of the wheel trucks of such railroad cars passing thereby.

2. A hotbox detector system in accordance with claim 1, wherein the portion of the vertical face of said arch bars imaged on said heat-sensitive means is that portion just above the bearing housings of such wheel trucks.

3. A hotbox detector system in accordance with claim 1, wherein said optical imaging means is mounted at wayside and at substantially axle height, with the direction of observation being between approximately 30° and 60° with respect to the direction of motion of said train in a horizontal plane.

4. A hotbox detector system in accordance with claim 1, with the direction of observation being slightly upward toward the wheel truck arch bars, at approximately 5° in a vertical plane.

5. A hotbox detector system in accordance with claim 1, and including
heat generating means for irradiating said heat-sensitive means, and
means adapted to be operated by a wheel of such passing railroad car for energizing said heat generating means,
whereby said heat-sensitive means provides an output indicative of the sum of the heat energy incident thereon from both said heat generating means and a respective vertical arch bar surface upon the passage of each wheel of such railroad cars.

6. A hotbox detector system in accordance with claim 1, and including
optically reflective means intercepting a portion of such image formed on said heat-sensitive means, and
means for adjustably positioning said image-forming means,
whereby said image-forming means may be selectively positioned to create a desired image on said heat-sensitive means as observed on said reflective means.

References Cited

UNITED STATES PATENTS

| | | |
|---|---|---|
| 2,856,539 | 10/1958 | Orthuber et al. |
| 2,880,309 | 3/1959 | Gallagher et al. |
| 3,065,347 | 11/1959 | Bossart. |
| 3,095,171 | 6/1963 | Gallagher et al. |
| 3,120,936 | 2/1964 | Pelino. |
| 3,244,875 | 4/1966 | Crane et al. |
| 3,253,140 | 5/1966 | Sibley et al. |
| 3,313,933 | 4/1967 | Sibley. |
| 2,818,508 | 12/1957 | Johanson et al. |

OTHER REFERENCES

An article written by E. G. Menaker, titled "The Fundamentals of Infra-Red Hotbox Detection," appearing in pages 178–186 in the July 1963 issue of the IEEE Transaction on Application and Industry (No. 67).

DRAYTON E. HOFFMAN, *Primary Examiner.*